Sept. 10, 1940.  C. VON DEN STEINEN  2,214,710

WATER CURRENT RESPONSIVE DEVICE FOR SHIPS

Filed Oct. 13, 1937  3 Sheets-Sheet 1

Inventor:
Carl von den Steinen.

By A. D. Adams
Attorney

Sept. 10, 1940.   C. VON DEN STEINEN   2,214,710
WATER CURRENT RESPONSIVE DEVICE FOR SHIPS
Filed Oct. 13, 1937   3 Sheets-Sheet 3

Inventor:
Carl von den Steinen

Patented Sept. 10, 1940

2,214,710

UNITED STATES PATENT OFFICE 2,214,710

WATER CURRENT RESPONSIVE DEVICE FOR SHIPS

Carl von den Steinen, Bergedorf, near Hamburg, Germany, assignor to Askania-Werke A. G., a corporation of Germany Application October 13, 1937, Serial No. 168,835
In Germany October 28, 1936

8 Claims. (Cl. 114—122)

This invention relates to devices for determining the action of water currents on floating objects, such as ships or the like, for the purpose of either scientifically determining the quality and quantity of water currents or for applying such knowledge for the stabilization of the floating objects.

Objects, aims and advantages of this invention will become apparent from the description and the accompanying drawings illustrating the principle of this invention and showing for purely illustrative purposes embodiments of this invention. It is to be understood, however, that the description is not to be taken in a limiting sense, the scope of this invention being defined in the appended claims.

Referring to the drawings.

It is a well-known fact that the molecules or particles, of which the water is composed, are at rest and have no movement relatively to each other when the sea is calm. Under the action of a storm or other causes, producing waves, the water particles begin to move. From this consideration it becomes easily apparent that an object floating in or on the water will be influenced by the relative displacement of the water particles in that a certain force is exerted on such objects.

Figure 1:
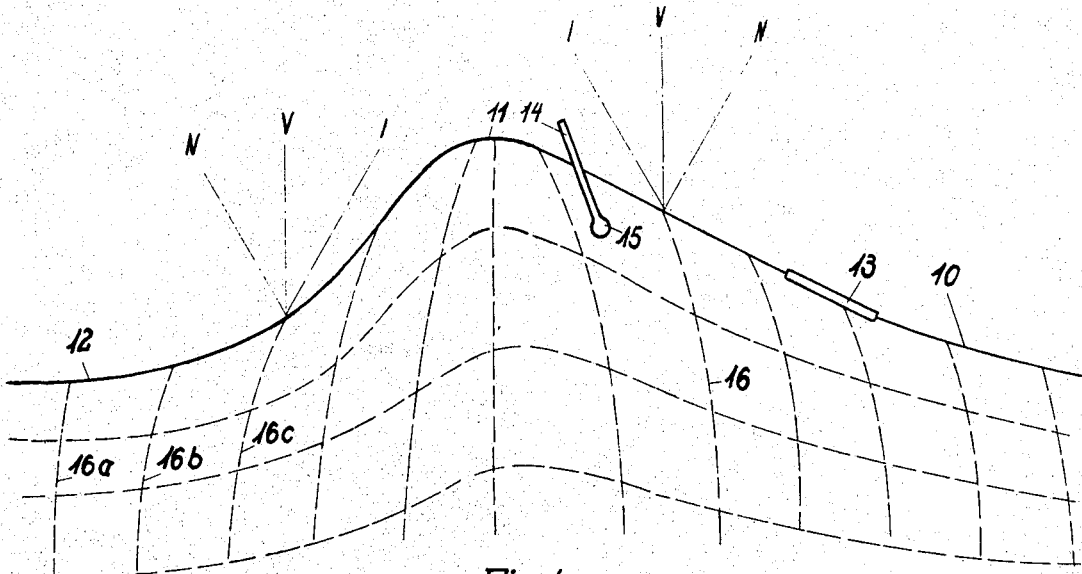
Fig. 1 is a diagrammatic illustration of the movement of water particles and objects floating on and in the water under the action of a wave.

Fig. 1 is a vertical cross section through a wave and shows how the water particles are displaced relatively to each other. The surface of the water 10 rises to a top 11 to slope down beyond this point at 12. Two objects, a flat board 13 and a buoyant pole 14, loaded at the bottom by a weight 15 are shown as floating on or in the water. It may be assumed for the purpose of illustration that the water particles were arranged in vertical planes when the water was calm. Under the influences of periodic waves the water particles are moved out of the position which they had assumed in calm water and the primarily vertical particles planes become inflected as indicated by the curved lines 16a, 16b, 16c, etc. When investigating the line in which a supposed particle plane intersects the surface of the water, I have found that the inflection of the plane with respect to the true vertical is of equal magnitude but oppositely directed as a plane normal to the surface of the water at the respective line. This is illustrated in Fig. 1 by the lines V indicating the true vertical, the lines I indicating the inflection of the respective plane and the lines N indicating the direction normal to the surface of the water. The inflection of the particle plane is illustrated by the inclination of the pole 14 which is substantially the same as the inclination of the respective particle plane.

As the pole does not assume the inclined position except under influence of a force acting on the pole, it follows that a water current resulting from the relative movement of the water particles acts on objects extending downwardly into the water. A relatively flat object, such as the board 13, is naturally not substantially affected by such currents and remains parallel with the surface of the water.

As a ship extends into the water exposing thereby a substantial part of its surface to water currents, it follows that a knowledge of the aforementioned water currents is of great importance for the problem of stabilizing ships.

It is, accordingly, an object of this invention to provide an instrument by means of which the action of water currents directed transversely to the longitudinal axis of the ship may be determined.

It is a further object of this invention to provide a device by means of which impulses derived from such transverse water currents may be applied in stabilizing ships.

Figure 2:
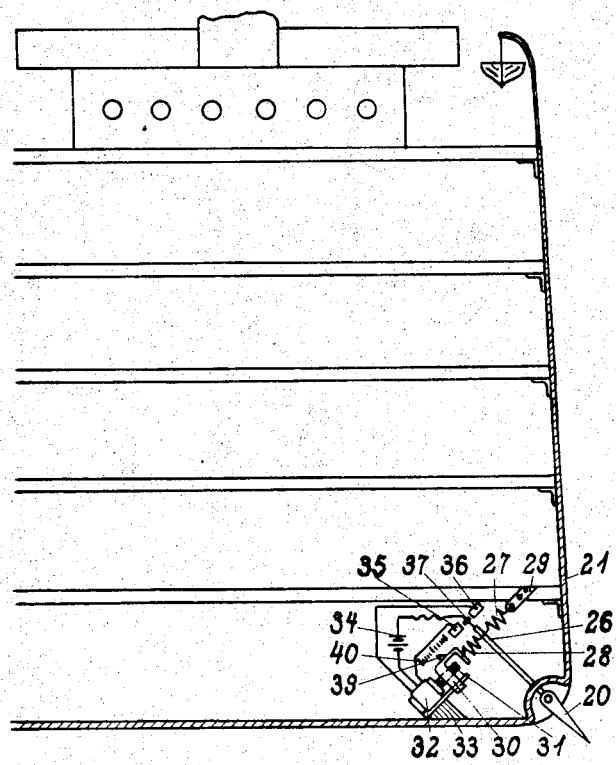
Fig. 2 is a sectional elevation of a ship equipped with a water current responsive device according to this invention.

In Fig. 2 two devices are shown by means of which the magnitude of transverse water currents may be determined and also impulses be derived therefrom for the purpose of stabilizing ships.

For determining the magnitude of the force exerted on a ship by transverse water currents I found it suitable to expose a surface to the current and to neutralize the water force tending to displace the surface, whereby the neutralizing force becomes a measure of the magnitude of the water current acting on the ship. For this purpose a keel surface 20 is shown as movably mounted in the ship 21 with its shaft 22 which is supported in bearings 23 and 24, the latter bearing being provided with a stuffing box 25 for preventing a leakage of water into the interior of the ship. An arm 26 is secured to the end of the shaft 22 to the free end of which springs 27 and 28 are attached.

In order to obtain accurate measurements I find it advisable to use tension springs rather than compression springs, since the latter have the tendency to yield sideways, instead of maintaining their proper axes. The spring 27 is therefore tensioned between the arm 26 and a fixed point 29 thereby tending to turn the arm clockwisely. The second spring 28 is arranged between the arm and an adjustable bracket 30 having a screw threaded bore for engagement with a threaded spindle 31. The spindle is rotatable by means of a reversible motor 32 mounted on a base 33. The motor is suppled with current from a battery 34 and controlled by means of fixed contacts 35 and 36 between which a movable contact 37 on the arm 26 is arranged.

It is apparent that upon movement of the bracket in a direction towards the motor the tension of the spring 28 is increased and the arm 26 moved counter-clockwisely, while upon a movement in an opposite direction the spring 28 is released causing the spring 27 to turn the lever in the opposite direction.

The action of the device, so far described, is as follows:

A transverse current moving in the direction of the arrow 38 relatively to the ship will exert a force on the keel 20 turning the lever 26 in a counter-clockwise direction. The contacts 35 and 37 are closed, thereby causing the motor 32 to turn the spindle and move the bracket 30 away from the motor until the force of the spring 27 causes the contacts to break. It becomes thus apparent that the relative position of the spindle and the bracket are a measure of the magnitude of the transverse current. For indication of the magnitude I have shown a pointer 39 attached to the bracket and moving relatively to a fixed scale 40.

Figure 5:
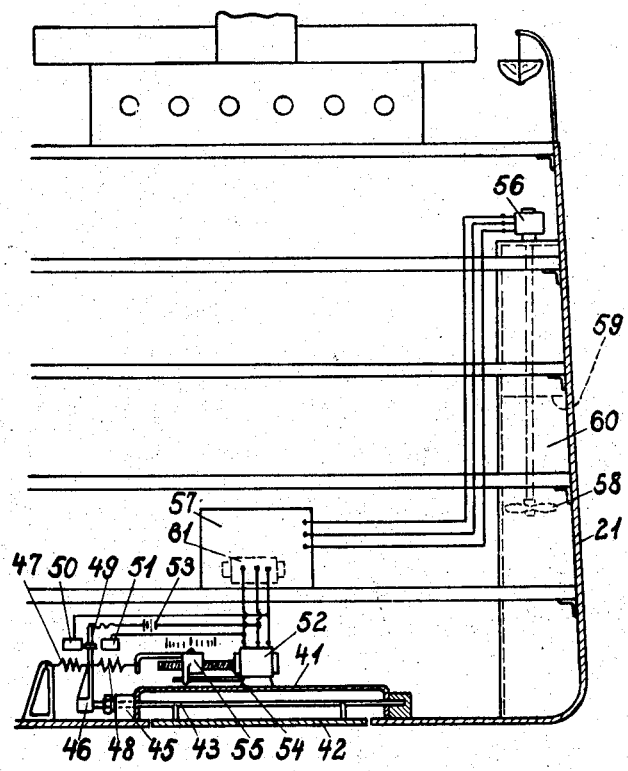
Fig. 5 is a sectional view of a ship equipped with another form of water current responsive device.

When it is desirable not to increase the wetted surface of the ship the surface exposed to the action of the water current may be arranged flush with the ship's hull. To illustrate this embodiment the ship's hull in Fig. 5 is shown as provided with a chamber formed by an inner wall 41 and a movable surface or plate 42. The plate is provided with guide bars, one of which is shown as 43 and movable in bearings 44 and 45. To the end of the bar an arm 46 is secured acted upon by springs 47 and 48 and controlling a contact 49 movable between fixed contacts 50 and 51. For illustrating the tension of the springs a motor 52 is shown fed from a battery 53 and controlled by contacts 49, 50, and 51. The motor turns a spindle 54 for displacing a bracket 55 relatively thereto, thereby adjusting the tension of the springs.

A transverse water current exerts a friction on the surface 42 which, otherwise, is not affected by a flow of water in longitudinal direction of the ship, as the surface is not movable in the longitudinal direction. Upon a displacement of the surface 42 relatively to the hull the contacts 49, 50, and 51 are actuated and the springs adjusted until the frictional force of the water is neutralized.

It has become a practice to equip ships with fixed bilge keels in order to reduce the rolling movement. The bilge keels extending into the water are supposed to act as a break and serve to dampen the rolling movement. Greatly to the surprise of naval architects it was found that many ships after being equipped with fixed bilge keels have the tendency to roll worse than before. As far as I am aware no explanation for this unexpected behaviour was found heretofore. Many experiments conducted with the hereinbefore described apparatus for determining the magnitude of transverse water currents have shown that under certain conditions bilge keels, instead of dampening the rolling movement, increase the same by being acted upon by transverse currents. Stabilized ships and ships having a relative small inherent stability are badly affected by transverse currents.

According to this invention I therefore propose to derive an impulse from the magnitude of the transverse currents and to apply the same in controlling a stabilizing force acting on the ship.

In my copending application Ser. No. 93,024 of July 28, 1936, I have disclosed a method of, and an apparatus for, stabilizing a ship with respect to the true, or to the apparent, vertical. Reference may be had to the description of my application for particulars.

As an example for the application of the present invention for stabilizing purposes there is shown in Fig. 5 a reversible motor 56 controlled by a stabilizer 57 and equipped with a propeller 58 for raising or lowering the surface 59 of water inside a stabilizing tank 60 in order to exert a moment on the ship. For the purpose of introducing an impulse proportional to the force of a transverse current a repeater motor 61 is shown as associated with the stabilizer which, otherwise, may be of conventional construction or of a design shown in my copending application, hereinbefore referred to.

Figure 6:
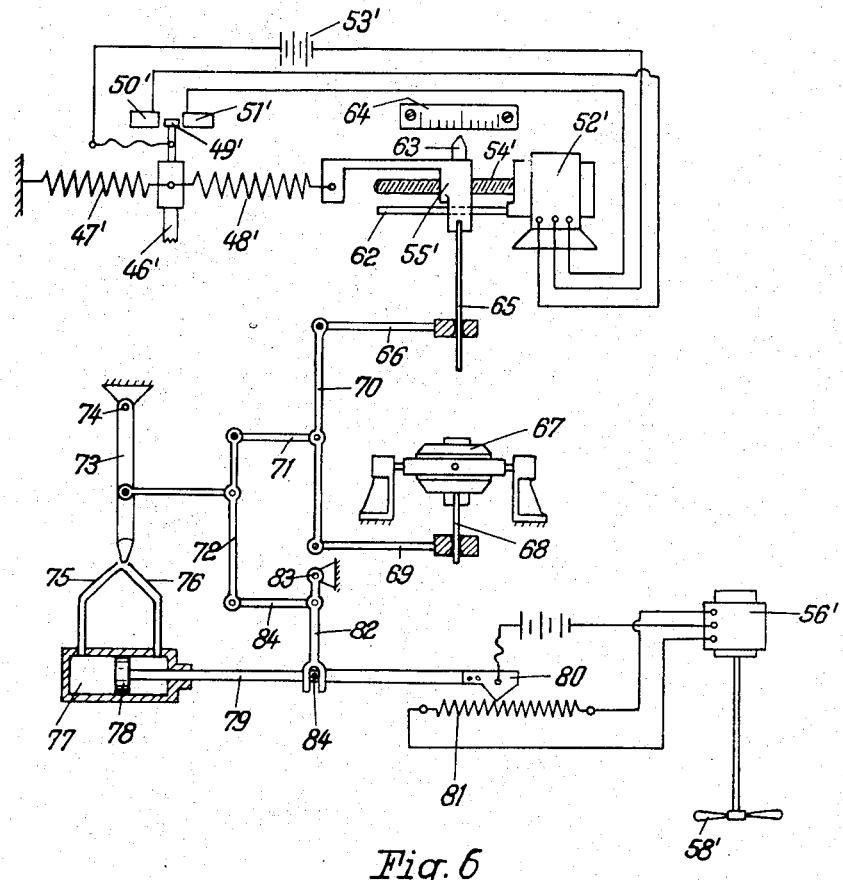
Fig. 6 is a diagram illustrating how impulses derived from transverse water currents may be utilized for stabilizing ships.

A diagram illustrating how, in detail, the present invention may be applied for stabilizing purposes is shown in Fig. 6. Primed reference numerals are employed to designate parts corresponding with elements of Fig. 2. The arm 46' acted upon by springs 47' and 48' is provided with a contact 49' movable between fixed contacts 50' and 51' to control the reversible motor 52'. The motor turns a spindle 54' upon which a bracket 55' is movable, the latter being prevented from rotating with the spindle by means of a guiding bar 62. For reading the resulting force of the springs a pointer 63 and scale 64 are shown.

For controlling the stabilizing motor 56' in response to the magnitude of the transverse current controlling impulses are derived in this embodiment from the bracket 55' by means of a flat spring 65 engaging a lever 66. A positional impulse proportional to the inclination of the ship with respect to the true vertical is derived from a gyro vertical 67 also equipped with a flat spring 68 and acting upon a lever 69. The levers 66 and 69 are linked to a double armed lever 70 imparting a combined movement to a connecting lever 71 to one end of a controlling double armed lever 72. The controlling lever is connected to act on a relay for controlling the source of stabilizing power acting on the ship. In the illustrated embodiment the relay is shown as being of the well-known "Askania" jet-pipe type. A jet-pipe 73 supplied with pressure fluid from a source (not shown) is pivoted at 74 and issues a jet of pressure fluid into reception conduits 75 and 76 depending upon the relative position of the conduit orifices and the jet-pipe. The conduits 75 and 76 are connected with the interior of a servo-motor 77 including a movable piston 78. The piston is connected to a piston rod 79 and connected to operate a movable contact 80 relatively to a rheostat 81, the latter controlling the direction of the reversible motor 56'. For restoring the jet-pipe 73 to its neutral position in order to prevent an "overshooting" or "hunting" of the device a forked lever 82 is shown pivoted at 83 and engaging a pin 84 in the rod 79. The lever 82 is connected to the controlling lever 72 by means of a pin 84.

The operation of the device shown in Fig. 6 is as follows:

Upon a deviation of the ship from the vertical position, to which the gyroscope responds, or, upon the action of a transverse current, to which the current responsive instrument responds, or both, the levers 66 and 69 will be actuated moving the jet-pipe 73 to register with one or the other of the reception conduits 75 and 76. Thereupon the piston of the servo-motor will be moved until through the restoring connection 82, the relay is restored to its neutral position. While normally the controlling contact 80 is positioned in the middle of the rheostat 81, whereby the motor is at rest, the motor will be caused to turn in the one or the other direction upon a displacement of the movable contact 80 from its middle position. The propeller 58 will, accordingly, cause a moment to be exerted on the ship counter-acting the transverse current and other forces causing the ship to roll.

Figure 4:
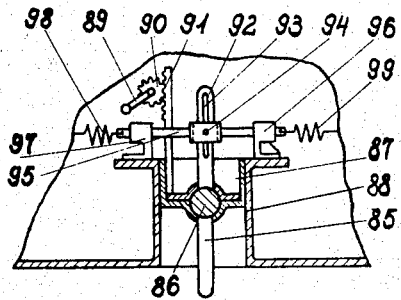
Fig. 4 is a modified form of a water current responsive instrument of Fig. 2.
Figure 3:
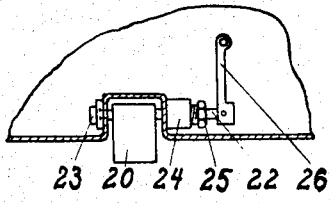
Fig. 3 is a side elevation of a detail of Fig. 2, partly in section.

Since it is often desirable not to increase the wetted surface of the hull, the movable bilge keel may be made retractable as shown in Fig. 4. A bilge keel 85 is movably mounted with its shaft 86 in a piston like support 87, slidable in a cylinder shaped opening 88 in the bottom of the ship. The support 87 may be raised or lowered by means of a crank 89 and pinion 90 meshing with a rack bar 91. The keel is provided with the usual arm 92 having a slot 93 in this embodiment and engaging a pin 94 of a bar 95, slidable in bearings 96 and 97. The usual tensioned springs are indicated at 98 and 99.

Obviously the present invention is not restricted to the particular embodiments herein shown and described. Moreover it is not indispensable that all the features of the invention be used conjointly, since they may be employed advantageously in various combinations and subcombinations.

What is claimed is:

1. In a stabilizing system for ships, including means for exerting stabilizing movements transversely on the ship, a member on the ship's hull below the water line including a surface exposed to displacement forces of the water particles caused by the waves; means supporting said member for movement back and forth in a path transverse to the longitudinal axis of the ship; yieldable means operatively connected to said member and biasing it to a neutral position; power means and means operatively connecting the power means to said member to act in opposition to the displacement force; control means for the power means operatively connected to and actuated by movements of said member, whereby the power means acts to maintain said member substantially in its neutral position; means operatively connected to the power means to measure the magnitude of the forces acting to bias said member; and means responsive to the magnitude of said forces connected to control the ship stabilizing means.

2. In a stabilizing system for ships, including means for exerting stabilizing movements transversely on the ship, a member on the ship's hull below the water line including a surface exposed to displacement forces of the water particles caused by the waves; means supporting said member for movement back and forth in a path transverse to the longitudinal axis of the ship; spring means connected to and biasing said member to a neutral position; a reversible motor; means operatively connecting the motor to said member to act in opposition to the displacement force; control means for the motor operatively connected to and actuated by movements of said member, whereby the member is maintained substantially in its neutral position; and force measuring means operated by said motor.

3. In a stabilizing system for ships including means for exerting stabilizing movements transversely on the ship, a plate mounted on the ship's hull below the water line and exposed to displacement forces of water particles caused by the waves; supporting means for said plate including suspension means and slide bearings therefor transversely of the ship guiding it to reciprocate transversely of the ship; an arm connected to and movable by said supporting means; opposed springs connected to said arm and biasing said plate to a neutral position; a reversible motor; control means for the motor operatively connected to said arm, whereby the motor operates in response to slight reciprocating movements of said plate; and means operatively connecting said motor to said arm to act on said plate in opposition to the displacement force and thereby simultaneously obtain a measure of said force.

4. In a stabilizing system for ships including means for exerting stabilizing movements transversely on the ship, a plate mounted on the ship's hull below the water line substantially flush with the outer surface of the hull and exposed to displacement forces of water particles caused by the waves; supporting means for said plate including suspension means and slide bearings guiding it to reciprocate transversely of the ship; an arm connected to and movable by said supporting means; opposed springs connected to said arm and biasing said plate to a neutral position; a reversible motor; means connecting the motor to be controlled by slight reciprocating movements of said plate; a screw-threaded spindle operated by said motor; a bracket member operable by said spindle and connected to one of said springs to act on said arm and plate in opposition to the displacement force; and force measuring means associated with said bracket member.

5. In apparatus of the class described, a device for measuring the force of water currents transversely of a ship produced by displacement of water particles by the waves, a member carried by the ship's hull below the water line including a surface exposed to the transverse displacement forces of the water particles caused by the waves; supporting means for said member mounted for slight movement back and forth in a path transverse to the longitudinal axis of the ship; resilient means operatively connected to said member and biasing it to a neutral position; power means operatively connected to said member; control means for the power means operatively connected to said member and actuated by its movements, whereby the power means acts in opposition to the displacement force to maintain said member in a neutral position; and force measuring means also operatively connected to and actuated by said power means, whereby the displacement forces may be determined.

6. In apparatus of the class described, a ship's hull having a recess formed therein below the water line, said recess having side walls; a plate positioned in said recess substantially flush with the outside surface of the hull and exposed to displacement forces of the water particles caused by the waves; supporting means for the plate mounted in said recess behind the plate including suspension members approximately parallel with the plate; slide bearings in said walls carrying said supporting means, said bearings arranged transversely of the ship to permit slight reciprocation of the plate in the recess transversely of the ship and substantially in the plane of the ship's hull; and means within the ship's hull connected to said supporting means to bias the plate toward a neutral position.

7. In a device for determining the action of transverse water currents on ships resulting from the relative displacement of the water particles caused by the waves, a measuring plate substantially flush with the surface of the ship's hull for measuring the magnitude of the transverse force exerted by said water currents transverse to the longitudinal axis of the ship, said measuring plate being movably mounted on the ship's body and actuated by said water currents; power means for exerting a counterforce on said measuring plate in opposition to the transverse force to be measured so as to hold the measuring plate in substantially the same position relative to the means in response to said counterforce; and means for indicating the magnitude of the force of the water currents.

8. In a stabilizing system for ships, measuring means responsive to the action of transverse water currents on the ship resulting from the relative displacement of the water particles caused by the waves, said measuring means including a surface for measuring the magnitude of the transverse force exerted by said water current, said surface being movably mounted on the ship's body so as to be actuated by said currents transverse to the longitudinal axis of the ship; power means for exerting a counterforce on said surface in opposition to the transverse force to be measured so as to hold the surface in substantially the same position relative to the ship; means operatively connected to be controlled by said power means in response to said counterforce; second means for exerting a stabilizing moment on the ship; means responsive to the magnitude of said transverse force for controlling said second power means; and means for indicating the magnitude of the force of the water currents.

CARL von den STEINEN.